April 23, 1957 G. S. BLUFORD ET AL 2,789,471

LIGHTWEIGHT RECOILLESS ARTILLERY WEAPON

Filed Feb. 7, 1951 8 Sheets-Sheet 1

INVENTORS.
GUION S. BLUFORD.
C. WALTON MUSSER.
BY J. H. Church, O. Codier + H. I. Forman
ATTORNEYS.

LIGHTWEIGHT RECOILLESS ARTILLERY WEAPON

Filed Feb. 7, 1951 8 Sheets-Sheet 2

INVENTORS.
GUION S. BLUFORD.
C. WALTON MUSSER.
BY J. H. Church, O. Codier + H. I. Forman
ATTORNEYS.

April 23, 1957 G. S. BLUFORD ET AL 2,789,471

LIGHTWEIGHT RECOILLESS ARTILLERY WEAPON

Filed Feb. 7, 1951 8 Sheets-Sheet 3

INVENTORS.
GUION S. BLUFORD.
C. WALTON MUSSER.
BY J. H. Church, A. Codier + H. I. Forman
ATTORNEYS.

April 23, 1957 G. S. BLUFORD ET AL 2,789,471

LIGHTWEIGHT RECOILLESS ARTILLERY WEAPON

Filed Feb. 7, 1951 8 Sheets-Sheet 4

INVENTORS.
GUION S. BLUFORD.
C. WALTON MUSSER.
BY J. H. Church, O. Codier + H. I. Forman
ATTORNEYS.

LIGHTWEIGHT RECOILLESS ARTILLERY WEAPON

Filed Feb. 7, 1951 8 Sheets-Sheet 5

INVENTORS.
GUION S. BLUFORD.
C. WALTON MUSSER.
BY J. H. Church, O. Codiert
H. I. Forman
ATTORNEYS.

INVENTORS.
GUION S. BLUFORD.
C. WALTON MUSSER.
BY J. H. Church, O. Codier +
H. J. Forman
ATTORNEYS.

LIGHTWEIGHT RECOILLESS ARTILLERY WEAPON

INVENTORS.
GUION S. BLUFORD,
C. WALTON MUSSER.
BY J. H. Church, O. Codier + H. I. Forman
ATTORNEYS.

LIGHTWEIGHT RECOILLESS ARTILLERY WEAPON

Filed Feb. 7, 1951 8 Sheets-Sheet 8

INVENTORS.
GUION S. BLUFORD.
C. WALTON MUSSER.
BY J. H. Church, O. Codier + H. J. Forman
ATTORNEYS.

United States Patent Office 2,789,471
Patented Apr. 23, 1957

2,789,471

LIGHTWEIGHT RECOILLESS ARTILLERY WEAPON

Guion S. Bluford, Philadelphia, and Clarence Walton Musser, Glenside, Pa., assignors to the United States of America as represented by the Secretary of War Application February 7, 1951, Serial No. 209,892

3 Claims. (Cl. 89—1.7)

(Granted under Title 35, U. S. Code (1952), sec. 266)

The invention described herein may be manufactured and used by or for the Government for governmental purposes without the payment of any royalty thereon.

This invention relates to guns of the recoilless type and has special reference to nonrecoil guns wherein the forces of rearward reaction that result from a projectile's discharge are neutralized by forwardly acting counter-forces simultaneously set up by a rearward escape of propellent powder gases through openings or orifices in the gun's breech.

Broadly stated, the object of this invention is to provide exceptionally light weight and otherwise improved recoilless guns which incorporate the principles of design earlier disclosed and claimed by Kroeger-Musser U. S. Patents 2,466,714 and 2,472,111, and co-pending application Serial No. 36,506, filed July 1, 1948, now U. S. Patent No. 2,741,160, by Musser for "Heavy Caliber Recoilless Gun."

A more specific object is to simplify the structure and reduce the number of parts needed by the gun's breech and firing mechanisms, and to arrange those parts compactly so as to act in a unique and efficient manner.

Another object is to provide the aforementioned type of recoilless gun in which the venturi is a smooth, uninterrupted annular orifice completely contained within a single gun member.

A further object is to provide means for minimizing the time and cost of replacing the venturi and other breech and firing mechanisms which may become damaged or eroded upon extensive usage.

In accomplishing the foregoing, incorporation has been made in the new light weight gun of the "annular breech orifice," the "perforated cartridge case," the "torque compensation," the "tapered chamber," and other generally related principles which the aforementioned patents and co-pending application broadly cover. In supplement thereto, provision is made for improved breech firing mechanism constructions which are simpler, and easier to manufacture and to renovate, than comparable prior art weapons.

The invention itself, together with illustrative embodiments thereof, will best be understood from the following description when taken in conjunction with the accompanying drawings wherein.

Figure 1:
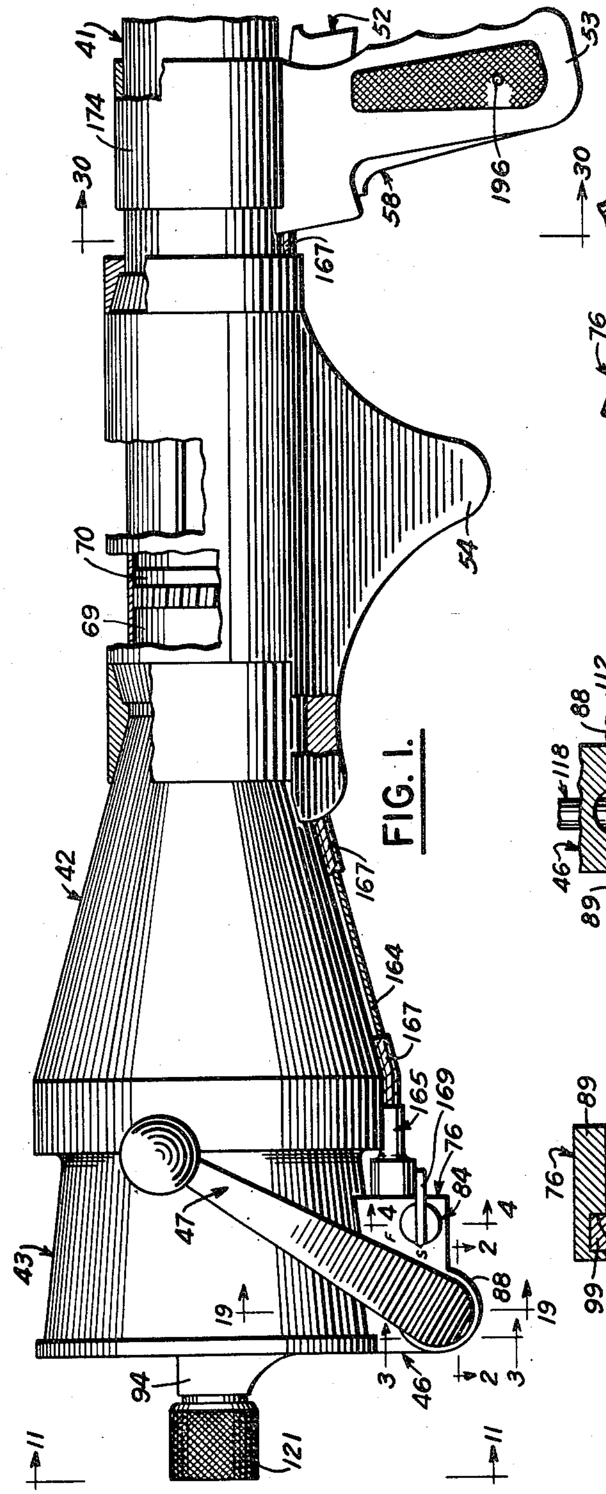
Fig. 1 is a view in side elevation, partly in section, of a recoilless gun of 57 mm. caliber incorporating the inventive features hereof. The forward portion of the barrel, and the telescopic sight customarily usable with the gun have been omitted for the sake of expanding this illustration to the maximum size possible.
Figures 11, 12, 13, 14:
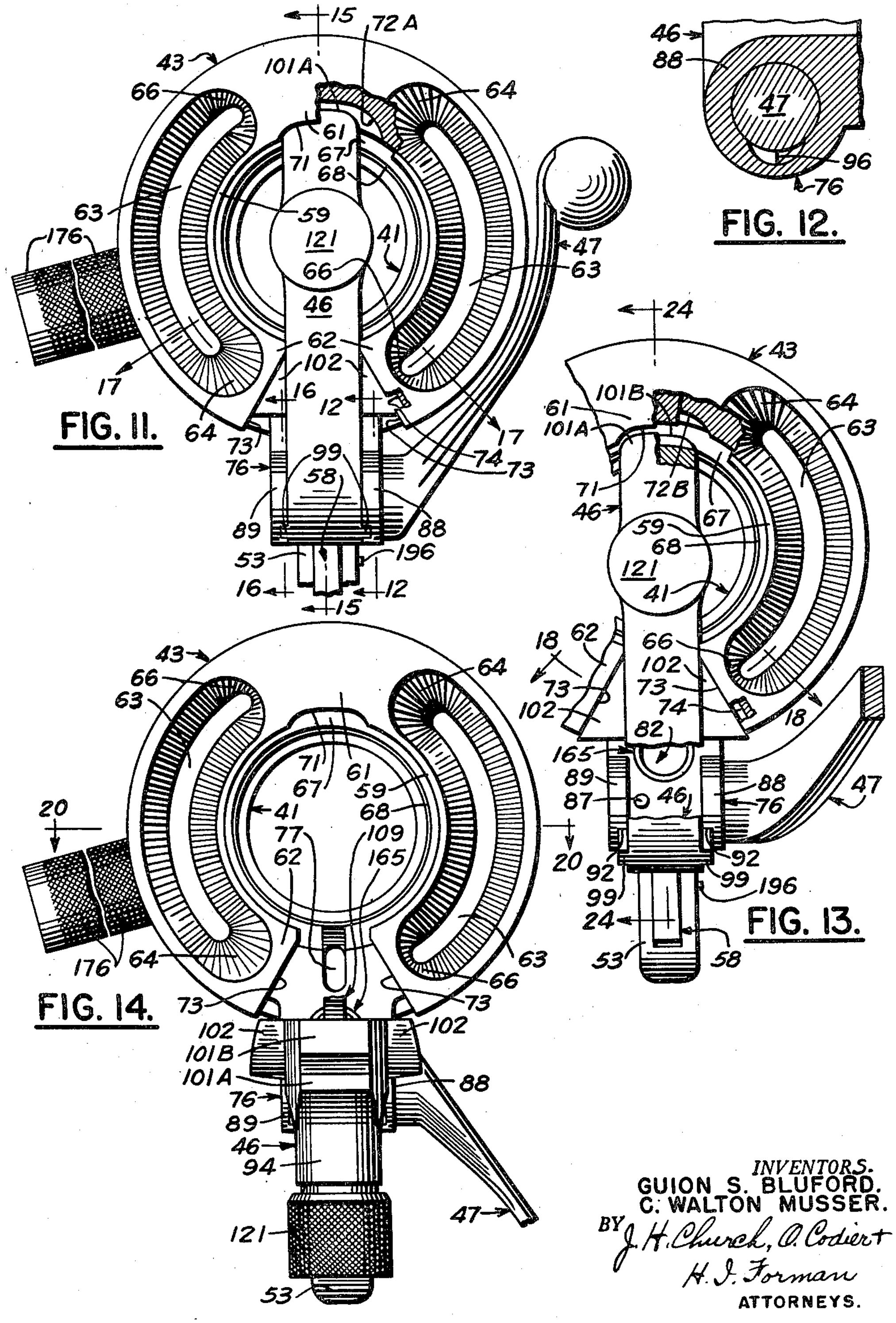
Fig. 11 is an end view, partly in section, taken along line 11—11 of Fig. 1 to show the breech block closed and locked, and also details of the breech block and venturi opening.
Fig. 12 is a section along line 12—12 of Fig. 11 showing the relationship of the bearing portion of the operating lever to the cleft hinge lug and part of a resilient closing plate.
Fig. 13 is a view similar to Fig. 11 but taken along line 13—13 of Fig. 5 to show the next progressive stage of opening the breech, the operating lever having been moved rearwardly so that the breech block has become unlocked although still closed.
Fig. 14 is a view similar to Figs. 11 and 13 but has been taken from line 14—14 of Fig. 8 to show the breech block fully withdrawn from the breech venturi ring.
Figures 15, 16, 16A, 16B, 16C:
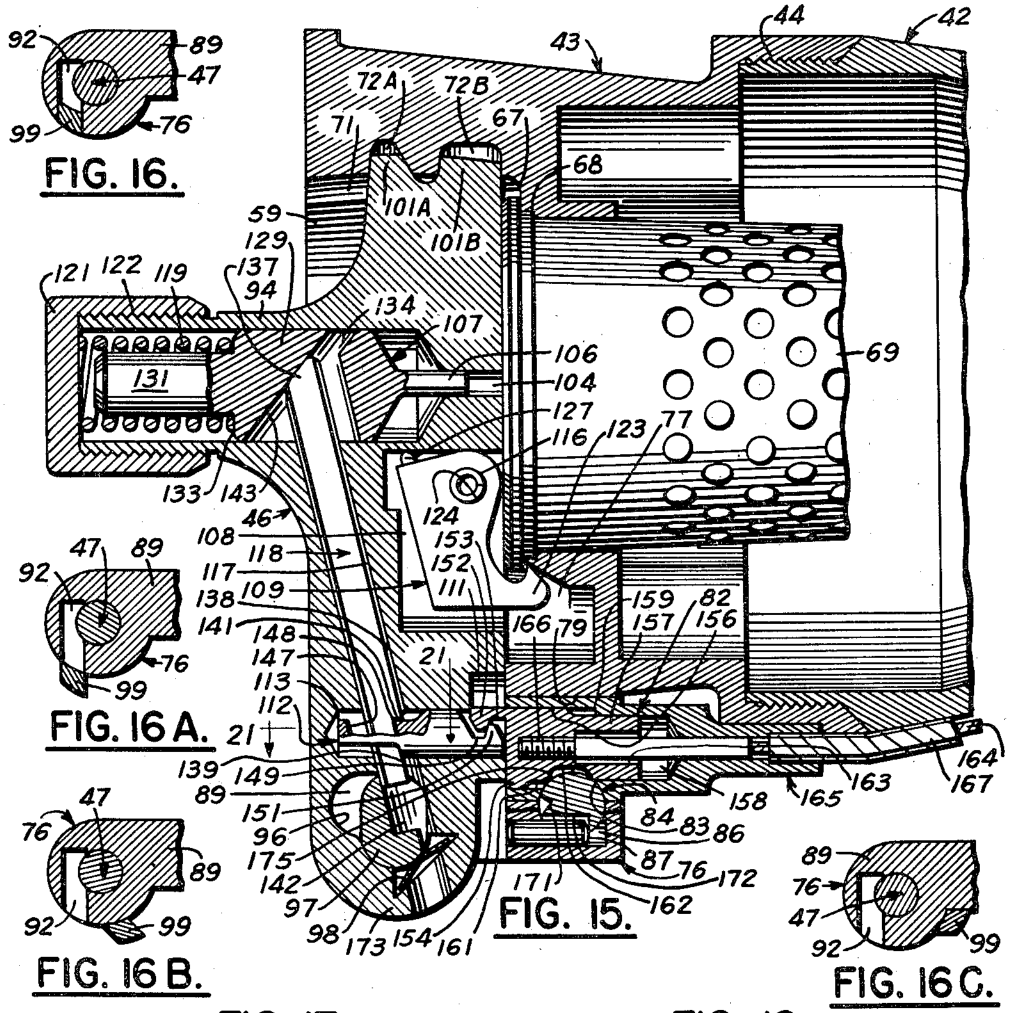
Fig. 15 is an enlarged section taken along line 15—15 of Fig. 11, showing the ammunition round in position with the breech block closed and locked, the safety in the "safe" position preventing the sear actuator from operating and thereby, through the sear and hammer actuator, keeping the hammer in the illustrated cocked, "ready-to-fire" position.
Figs. 16, 16A, 16B and 16C represent a section taken along line 16—16 of Fig. 11, and progressively showing the relationships between the small locking lugs on the breech block, the grooves in the cleft hinge lug and the circular contour of the hinge lug as the breech block is moved from the closed and locked to the fully opened position.
Figures 15A, 17, 18, 19:
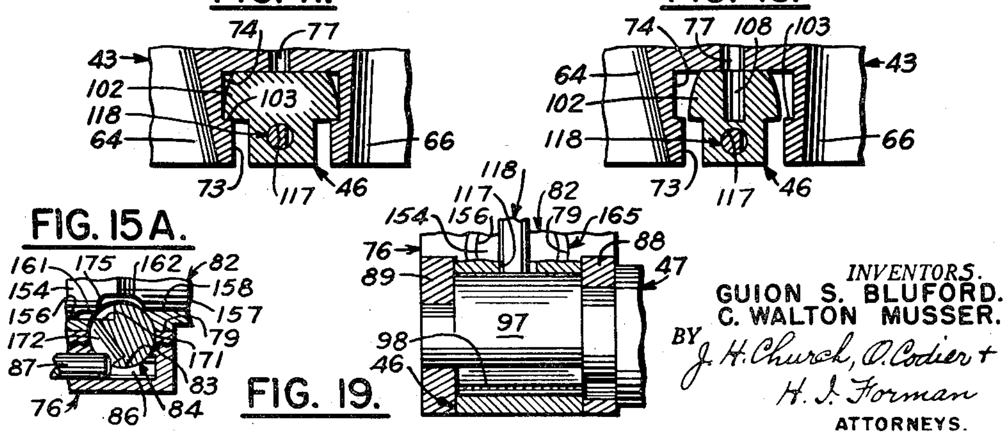
Fig. 15A shows the safety portion of the Fig. 15 illustration after it has been rotated so as to free the sear actuator for operation.
Fig. 17 is a section taken along line 17—17 of Fig.
Figures 15B, 21, 22, 23:
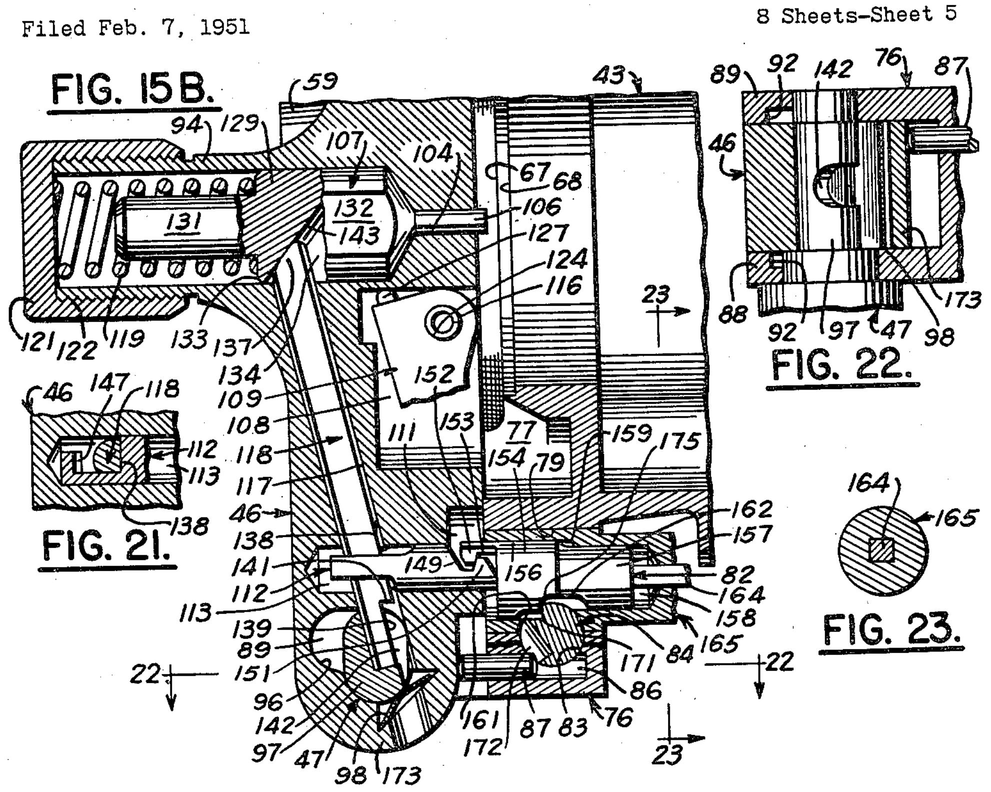
Fig. 15B is an enlarged view similar to that of Fig. 15 except that the various parts are shown after the ammunition round has just been fired.
Figure 20:
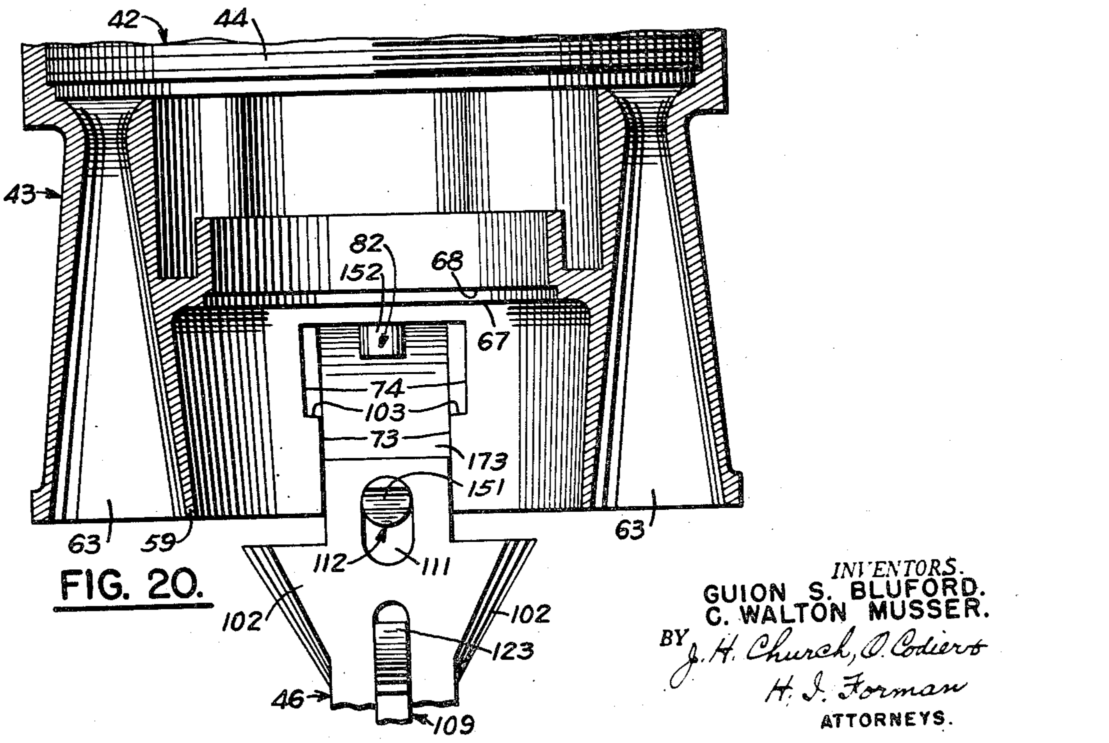
Figure 24:
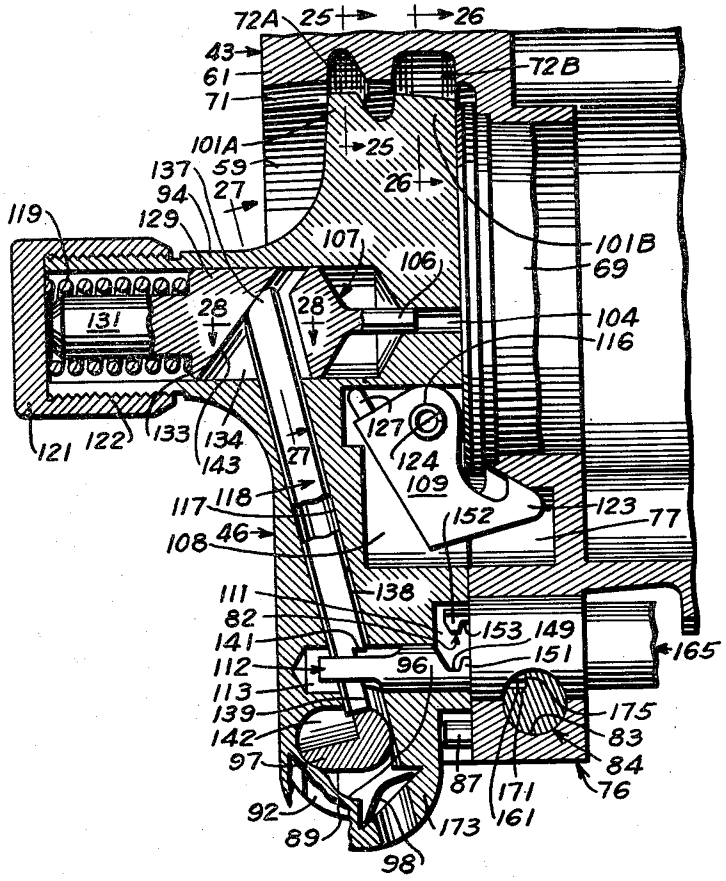
Figure 25:
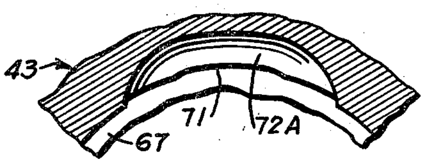
Figure 26:
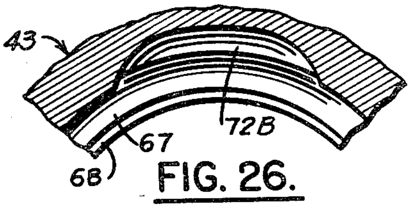
Figure 27:
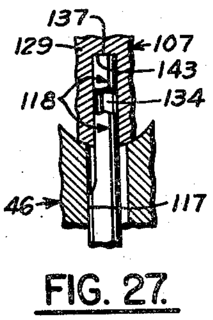
Figure 28:
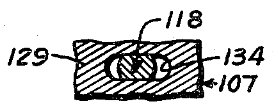
Figures 24A, 24B, 29:
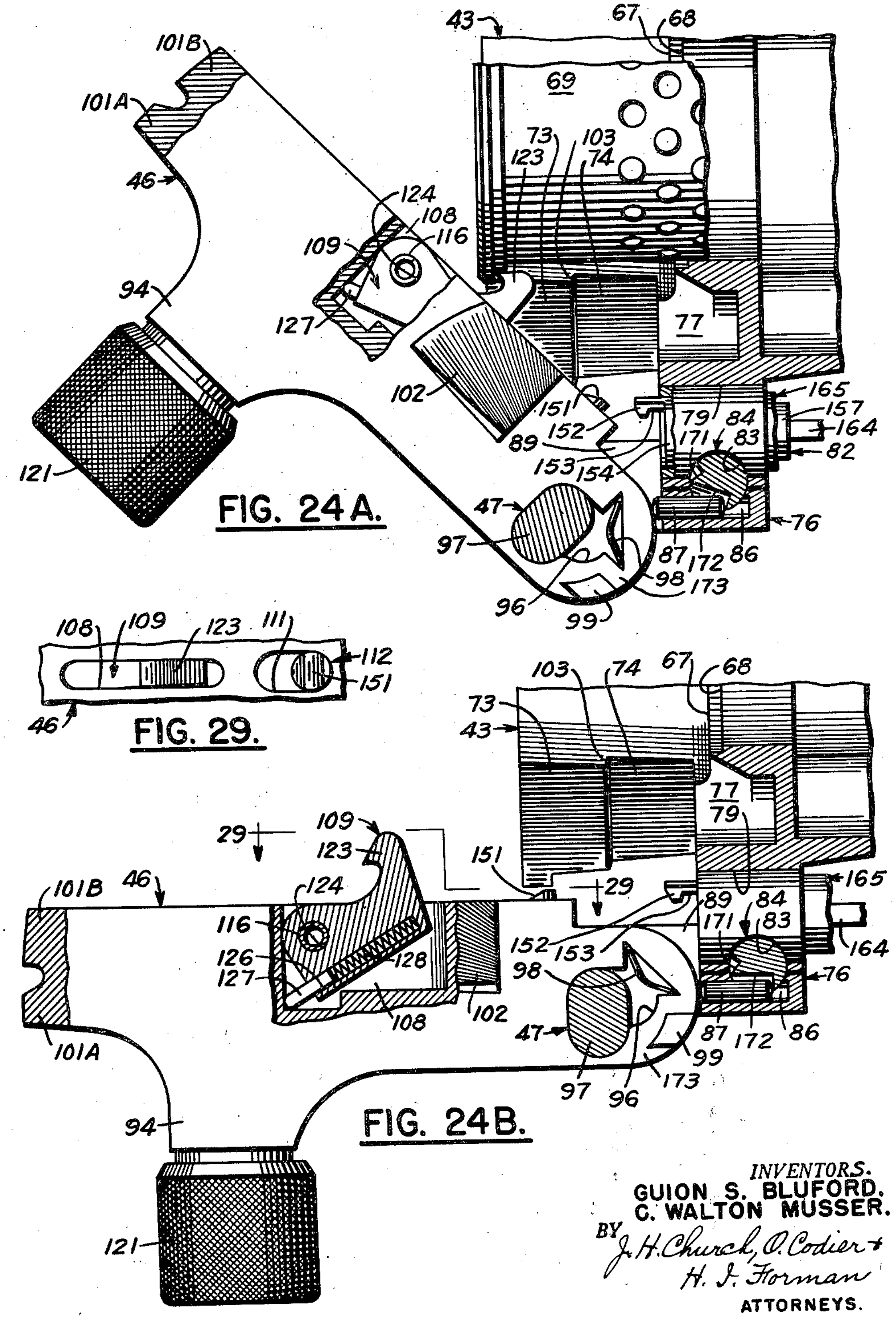
Figures 30, 31, 32, 33, 34:
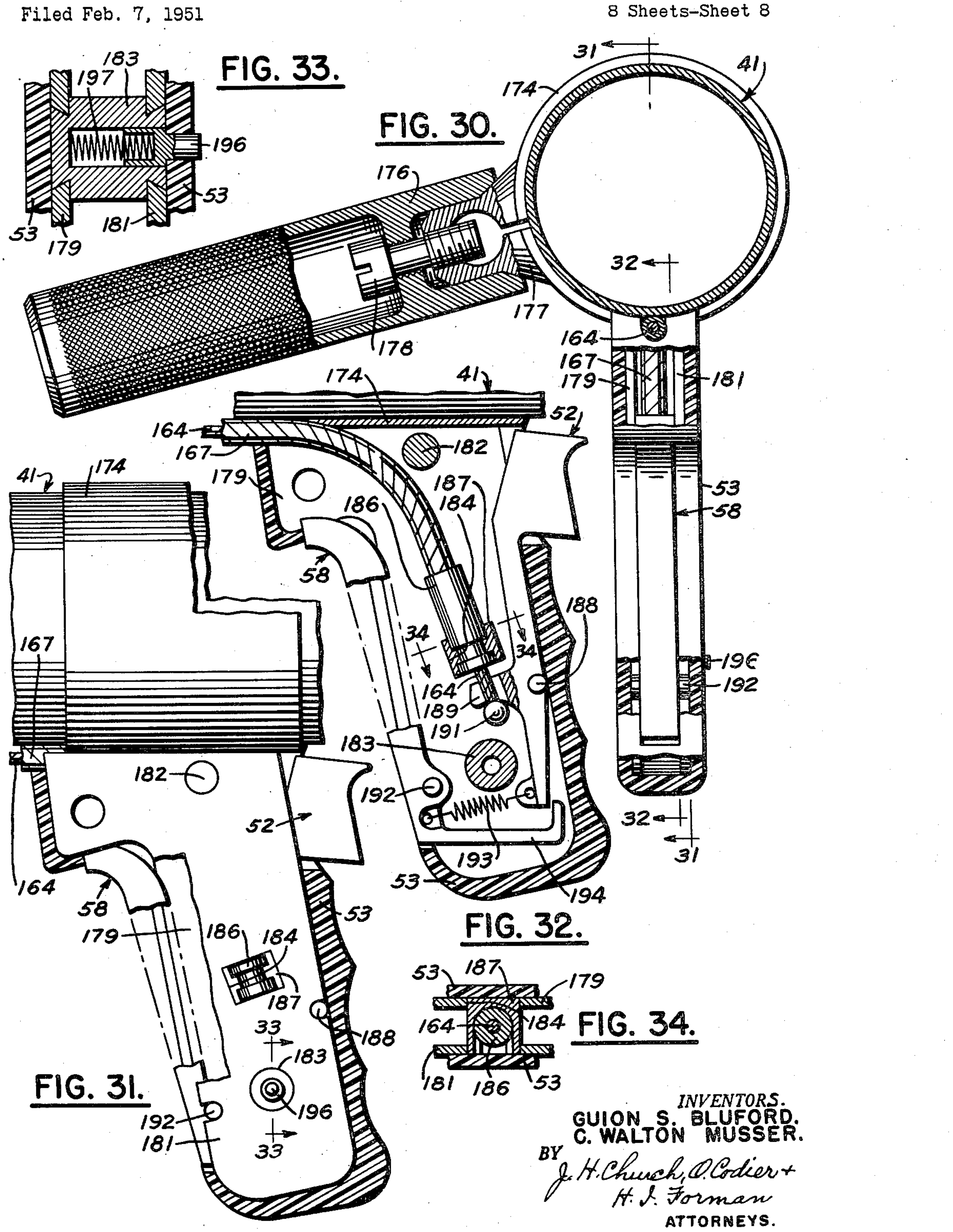

11 to show the locking engagement between the large triangular locking lugs on the breech block with the locking recesses therefor in the venturi ring;

Fig. 18 is a similar section taken along line 18—18 of Fig. 13 to show the relationship of the large triangular locking lugs on the breech block after disengagement from the locking recesses therefor in the venturi ring;

Fig. 19 is a section viewed from line 19—19 of Fig. 1 showing certain relationships of the cam portion of the operating lever, the breech block and the cleft hinge lug;

Fig. 20 is a sectional view taken from line 20—20 of Fig. 14 primarily to show the annular orifice and portions of the sear actuator, sear and case extractor;

Fig. 21 is a section taken along line 21—21 of Fig. 15 to show certain details of the sear and hammer actuator;

Fig. 22 is a section taken from line 22—22 of Fig. 15B to show certain relationships of the operating lever, sear, and safety actuating pin after the gun has been fired;

Fig. 23 is a section along line 23—23 of Fig. 15B showing the square shape of the firing cable terminal which is slidably accommodated in the housing fixture for the cable's rear end;

Fig. 24 is an enlarged sectional view, similar to that of Figs. 15 and 15B except that in this illustration the breech block is shown closed but unlocked, having been taken from line 24—24 of Fig. 13 to show how the hammer has been recocked after firing;

Figs. 24A and 24B are very similar views to that of Fig. 24, except that the block is shown progressively withdrawn away from the breech venturi ring similar to the positions represented in Figs. 13 and 14 respectively;

Figs. 25–26 are sections taken from lines 25—25 and 26—26, respectively, of Fig. 24 to show corresponding locking recesses for the breech block in the breech venturi ring;

Fig. 27 is a view on line 27—27 of Fig. 24 which shows the flattened portion at the top of the hammer actuator for mating with a recess in the hammer so as to prevent relative motion between those two members;

Fig. 28 is an analogous view taken along line 28—28 of Fig. 24;

Fig. 29 is a plan view taken along line 29—29 of Fig. 24B to show the extractor and recess therefor, the sear and the clearance recess for the tip of the sear actuator;

Fig. 30 is a view taken along line 30—30 of Fig. 1 through the gun barrel, and showing a handle which aids the operator in supporting the gun while aiming and firing it, and a special grip housing the trigger mechanism;

Figs. 31–32 are sectional views taken along lines 31—31 and 32—32, respectively, in Fig. 30, to show constructional details of the trigger mechanism;

Fig. 33 is a section taken along line 33—33 of Fig. 31 to show the detent and spring which serve to keep the special grip in place over the brackets housing the trigger mechanism; and Fig. 34 is a section taken along line 34—34 of Fig. 32 to show the means employed for securing the housing fixture for the firing cable's forward end in the bracket housing the trigger mechanism.

Figure 7:
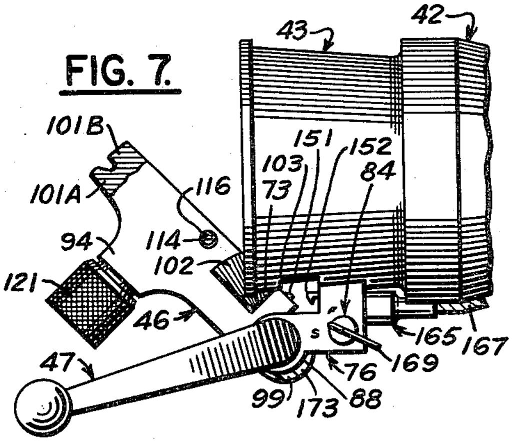
Fig. 7 is similar to the Fig. 5 illustration except that the operating lever has been moved so that the breech block has now been partly opened and withdrawn from the breech venturi ring.

In the description which follows hereinbelow positional references will repeatedly be made with respect to the drawings. In order to follow them clearly, it will be helpful for the reader to keep in mind that the gun's forward end is the muzzle end of the barrel, while the rear end is the breech portion. Fig. 1 shows the rear end at the left and the forward end (broken off) at the right. The right side of the gun (depicted in Fig. 1) is determined by viewing the gun forwardly from the rear end. References to "upper and lower" portions relate to locations on gun parts as they are situated in the Fig. 1 condition. In the later views, such as Figs. 5, 7 and 8 where the breech block is open, this manner of reference will be continued. Thus, for example, the term "upper" portion of the block will still be employed even though that portion will then be in a horizontal position and actually on a line with the "lower" portion of the gun proper.

*The complete recoilless gun*

The inventive improvements hereof are illustratively disclosed as being incorporated in a military weapon of 57 mm. caliber which is exceptionally light in weight, recoilless, and portable, specially designed to be fired from the gunner's shoulder. It is an air-cooled, single-loading gun using fixed ammunition and is equipped with a manually operated breech block enclosing a firing mechanism for firing artillery type percussion primers. The gun's overall length is approximately 48 inches, and its total weight ranges between 22 and 26 pounds, depending upon the fire control equipment and shoulder rest employed.

With lightness in weight an exceedingly important objective in seeking to place maximum firepower in the hands of individual gunners, the present novel construction has reduced by approximately one-half the metal heretofore required to form the gun's breech block. This has been done by a unique design in which the rear end or head of the cartridge case is made to serve as the block which seals the breech when the gun is fired.

Another feature of the present invention is that the annular venturi is contained entirely within a single member, namely the breech ring venturi, instead of being comprised of two or more associated members as in prior art designs. This new arrangement minimizes the possibility of powder gases washing against joints or interfaces between two such members and thus accelerating erosive malformation of the annular orifice.

As the description thereof proceeds, it will be noted that all the gun parts are uniquely "tied" together; i. e., the various functional parts are secured in their proper operative relationship by other functional gun parts, instead of by bolts, clamps, etc. as in conventional weapons. In fact, only one screw is employed in the entire gun, and this is used to attach to the weapon's barrel a bracket which supports the trigger mechanism. Thus, except for this bracket, the entire gun may be rapidly and easily assembled and disassembled without the use of any tools. Obviously, this factor plays an important part in the gun's utility, especially when it is used in the field of actual combat where gunners often are required to take apart, clean and reassemble their guns.

The novel weapon incorporates a sliding, hinged breech block and a single motion operating lever. After an ammunition round is fired, a single movement of the lever unlocks and opens the breech, re-cocks the firing mechanism, extracts the fired case, and simultaneously returns the safety mechanism to the "safe" position so that the weapon cannot be fired until the safety is manually turned again to the "fire" position. After a new round of ammunition is inserted into the gun, a single movement of the lever in the opposite direction closes and locks the breech.

The illustrated weapon has been found capable of a completely recoilless firing of projectiles weighing approximately three pounds, and has a range of over 4300 yards at a muzzle velocity of 1200 feet per second. Despite its lightness and compactness, the new gun may with complete safety to the user be fired with great accuracy and high military effectiveness. As the description proceeds, it will become apparent that the improvements incorporated into the present invention also may be applied to guns of character, sizes, and shapes other than the one here disclosed, and that the represented 57 mm. weapon thus has been chosen merely to illustrate and not to limit the apparently wide application and scope by which these improvements are characterized.

The illustrative recoilless gun here shown essentially comprises a barrel 41, whose rear end tapers outwardly to form a chamber 42; a breech venturi ring 43 threadedly secured to the rear of the chamber as indicated at 44; a breech block 46 partially closing the rear of the breech venturi ring; an operating lever 47; a cleft hinge lug 76 extending from the lowermost portion of the breech venturi ring to furnish support for the breech block and the operating lever; a firing safety 84; a cable 164 connecting the firing mechanism housed in the breech block with a trigger 52 for firing the weapon; a trigger housing and grip 53; and a shoulder and face rest 54.

As may be desired, a sight (not shown) of the "direct" telescopic type or of an "indirect" or other type may be employed with the gun. Prior to sighting the target, the user loads an ammunition round comprising a cartridge case 69 (having the perforated sidewall shown in Figs. 15 and 24A) and a projectile 70 (see Fig. 1) into the breech end of the weapon in a manner presently to be explained. This loading may be done either by the man firing the weapon or by an assistant. With the ammunition in the Fig. 15 position, the operator moves the operating lever 47 from the position shown in Figs. 14 and 24B forward or clockwise through 180 degrees to that shown in Figs. 1 and 15. The breech block is then closed and locked, and the hammer is cocked and ready to fire.

The operator then turns the firing safety 84 from the "safe" position marked "S" to the "fire" position marked "F" (see Fig. 1). He then sights his target, compresses a trigger safety 58 forwardly into trigger housing 53, and finally presses trigger 52 rearwardly within the trigger housing to fire the ammunition round.

*The gun's rifled barrel and tapered chamber*

In the illustrated weapon the barrel 41 is integral with the expanded tapered chamber 42 therebehind. This is a variation from the design of recoilless guns shown in the aforementioned patents and copending application which heretofore featured a separable barrel and chamber construction. The illustrated one-piece design has contributed to the exceptional lightness of the present weapon. Since the present design practically eliminates any erosion of the chamber by the powder gases, it is unnecessary to make the chamber detachable from the barrel as there is no longer the previous need for occasional replacement of either member. However, it will be obvious that a two-piece, separable construction of chamber and barrel could be employed if desired.

*The breech venturi ring*

As here shown, the breech venturi ring 43 consists essentially of a hollow cylinder open at both ends. Located within and concentric with ring 43 is a second cylindrical body 59 (see Figs. 11, 13, 14 and 15). This cylindrical body is spaced from the breech venturi ring by means of an upper metal wall portion or vane 61 and a lower metal wall portion or vane 62.

It will be noted that, except for the just-described vanes 61—62, the space which separates cylindrical body 59 from the venturi ring 43 defines what is essentially an annular orifice or venturi 63 that leads from the interior of venturi ring 43 to the rear exterior of the gun. Figs. 11, 13, and 14 show that this annular orifice is divided into two principal sections by vanes 61—62; and the same views, together with Fig. 20, show that the venturi has a broad expanded portion at the rear thereof and a narrower, restricted portion at the forward end. Each of the two venturi sections will be seen to have at one end a wall surface 64 which is angled away from the long axis of the gun, whereas the other end has a wall surface 66 which is relatively parallel to the axis of the gun. The purpose of this construction, which will become more obvious as the description hereof proceeds, is to furnish a torque to the explosive powder gases escaping rearwardly through the venturi. This torque can be so controlled that the gases will have a twisting movement which is equal but opposite in direction to that imparted by a projectile fired forwardly through the gun.

The forwardmost end of cylindrical body portion 59 is reduced in diameter to form a first shoulder 67 and a second, narrower shoulder 68. The purpose of these shoulders is to accommodate the head end of perforated cartridge case 69 (see Fig. 15) as will be explained later. Cartridge case 69, incidentally, is lined with frangible material (not shown) so as to contain the propellant powder (not shown) therein in a manner and for the purpose discussed fully in the aforementioned issued patents and co-pending application.

The upper metal wall portion or vane 61 will be seen from Figs. 11, 13 and 14 to have a channel 71 cut through for accommodating entrance and exit of the free end of breech block 46. Channel 71 extends from the rearmost portion of venturi ring 43 part way in toward shoulders 67—68. The channel terminates in a recess which is cut radially into vane 61 for accommodating the upper, free end of breech block 46. This recess may preferably be bifurcated as illustratively shown at 72A and 72B in Figs. 15 and 24, although it is perfectly satisfactory to have a single recess. Of course, in the illustrated construction the free end of breech block 46 must also be bifurcated to mate properly with the split recess.

The lower wall portion or vane 62 has a triangular, bi-dimensional recess cut deeply from its rear face forwardly thereinto. The rearmost portion 73 of this recess is the narrower of the two; forwardly there is a broader portion 74 (see Figs. 11, 13, 14, 24A and 24B). The forwardmost boundary of recessed portion 74 will be seen to be adjacent shoulder 67.

The lower vane 62 which forms the forwardmost boundary of recess 74, immediately behind shoulder 67, extends below the venturi ring perpendicular to the ring's axis and then turns at a right angle rearwardly to a point which is flush with the ring's rearmost portion. This depending or projecting portion will hereinafter be termed the cleft hinge lug 76. An exterior view of this just described construction will be found in Figs. 5, 7 and 8.

The portion of right-angled hinge lug 76 which projects from venturi ring 43 will be seen to have on its rearmost face a recess 77 for accommodating a cartridge case extractor 109, and a circular opening 79 for accommodating a housing fixture 165 for the rear end of firing cable 164 and a sear actuator 82. Near the juncture of the two arms of right-angled lug 76 there is a circular opening 83 which extends transversely through the lugs to accommodate a safety 84. On the same rearward face of lug 76 which bears case extractor recess 77 there is located, at a distance off the center, a recess 86 which accommodates a safety actuating pin 87. The reason why this pin is located off center will become apparent later on.

Referring now to the arm of hinge lug 76 which extends from the juncture of the right angle rearwardly parallel to the gun's axis, it will be noted that this arm is cleft into two parts, a right arm portion 88 and a left arm portion 89. The rearmost extremity of arms 88—89 will be seen to have specially shaped openings therethrough for accommodating the bearing portion of operating lever 47 as will be explained later. On the inner surfaces of arms 88—89, i. e., the surfaces which face each other, are located notches 92 which accommodate certain small locking lugs on the breech block, as will be described below.

*The breech block and operating handle*

As here shown, the gun's breech block 46 is removably secured within the rear of cylindrical body portion 59 of breech venturi ring 43, and constitutes only a partial closure therefor (see Figs. 11 and 13). This member 46 takes the form of an essentially rectangular block with a rearwardly extending cylindrical housing portion 94. Extending transversely through breech block 46 near its bottom extremity is a specially shaped opening 96 which accommodates the cam portion 97 of operating handle 47 and a resilient closing plate 98 (see Figs. 15 and 24). Projecting laterally from each side of member 46 below opening 96 is a small locking lug 99 which mates with the earlier mentioned notches 92 and has certain definite functions which will be described below.

The upper or free extremity of breech block 46 is adapted to feed into and lock with recess 72A, 72B in breech venturi ring 43. This free end of member 46 may be of a single, solid bar construction, although it is preferable to employ the illustrated bifurcated construction indicated at 101A, 101B in Figs. 15 and 24.

Extending laterally from each side of the breech block from an approximate midpoint between the upper and lower extremities, is a triangular or wedge shaped lug 102. These lugs are so shaped and of such size that, when the breech block is swung into the closed position (see Figs. 13 and 24), they are able to pass through recess 73 and into recess 74. Then, when the breech block is to be locked, it is urged upwardly from its hinged connection with hinge lug 76 so that triangular lugs 102 become wedged in recess 74 and prevent, by contact with a shoulder 103 that separates recesses 73 and 74, the rearward withdrawal of the breech block. When the breech block is urged upwardly as just described, its upper or free end (bifurcated into 101A and 101B in the illustrated weapon) enters its mating recess 72A, 72B so as to provide another locking means which prevents rearward withdrawal of the breech block from the closed breech position.

The forward face of breech block 46 contains a number of openings or recesses for accommodating certain other members. Uppermost is a small round hole 104 which connects interiorly with housing 94. Through hole 104 travels the firing pin 106 portion of the hammer 107 (see Figs. 15–15B and 24). Next below hole 104 is an elongated narrow recess 108 in which is mounted the cartridge case extractor 109. Below recess 108 is a broader but shorter recess 111 which, at its upper portion provides room for the rear, claw-like portion of sear actuator 82, while at the lower region it provides room for the forward, mating claw-like portion of a sear 112. The lower portion of recess 111 will be seen from Figs. 15, 15B and 24 to be continuous rearwardly with a blind cylindrical opening 113 that accommodates the sear 112.

There are two more openings in the breech block to be considered. One is a hole which extends transversely from one side of the block to the other, passing through recess 108 that accommodates the cartridge case extractor. Opening accommodates a resilient spring pin 116 which serves as a pivot and retaining means for the cartridge case extractor, as will be explained more in detail later. The other opening is a hole 117 that extends from the very bottom of breech block 46 upwardly and rearwardly into confluence with the cavity enclosed by cylindrical housing 94. Opening 117 serves to accommodate a hammer actuator 118, as will be discussed in detail below.

The earlier mentioned cylindrical housing 94 contains hammer 107 and a firing spring 119. The hammer and firing spring are retained in the housing by means of a cap 121 which is threadedly attached as indicated at 122.

*The cartridge case extractor*

The cartridge case extractor is a relatively thin platelike member 109 having a claw 123 (see Figs. 15 and 24). At the end of the extractor opposite the claw there is an opening 124 extending therethrough. Spring pin 116, which passes transversely through opening in breech block 46, also passes through this opening and thereby furnishes a pivotal mounting support for the extractor.

Extending into the extractor for almost its entire length is a blind hole 126 which opens on the side of the extractor opposite to that from which projects claw 123 (see Fig. 24B). An extractor pin 127 is resiliently loaded in blind opening 126 backed by an extractor spring 128.

*The firing hammer and cocking means*

Hammer 107, although being a single unit, essentially consists of three parts: the forward cylindrical firing pin 106, a central body portion 129 which has two lateral flat portions 132, and a rear cylindrical portion 131 of somewhat lesser diameter than body 129.

As Figs. 15, 15B and 24 will show, hammer 107 is mounted so that its essentially cylindrical body portion 129 is free to move forward and backward in housing 94. The flat surfaces 132 on either side of body portion 129 serve to permit air flow therepast as the hammer is so moved, and thus prevent resistance of the hammer's movement which would be caused if the air pressure were allowed to be built up within housing 94.

Separating hammer body portion 129 from the rear portion 131 is a shoulder 133. This shoulder serves to retain the forward end of firing spring 119. Thus, with the inner or forward face of cap 121 serving to hold the rear end of firing spring 119, the hammer can be spring loaded as shown in Fig. 15 so that when fired the hammer will be forced by the spring to move forwardly as shown in Fig. 15B.

Still considering the hammer in the position which it has when the breech block is closed, the hammer will be seen from Figs. 15, 15B and 24 to have a triangular recess opening thereinto from the bottom thereof. This recess accommodates the upper end of sear 118.

Referring now to the means for cocking the hammer, the parts involved will be seen to include the hammer actuator 118 and a cam portion 97 of operating handle 47. The hammer actuator is a long slender bar having a tapered or slanting end 137 at the top. Near its bottom end, on its forward face are two flat surfaces 138 and 139 separated by a shoulder 141 (see Figs. 15, 15B and 24).

Cam portion 97 in operating handle 47 serves to move hammer actuator 118 up and down within recess 117. Before the gun is fired, when the breech block is in its closed and locked position, operating handle 47 is in the position shown by Figs. 1 and 11 and the handle's cam portion 97 is in the position shown by Fig. 15. After firing, cam portion 97 remains in the same position, but as shown in Fig. 15B, sear 118 has dropped down so that its lowermost portion fills a right angled recess 142 in the cam (see Figs. 6, 9, 15, 24). When operating handle 47 is turned to the Fig. 13 position preparatory to opening the breech block, cam 97 is rotated to the position shown in Fig. 24. In so doing, the cam pushes hammer actuator 118 upwardly so that the latter member's uppermost end 137 pushes against the slanted surface 143 inside the hammer's recess 134, thus causing the hammer to move rearwardly into the cocked position.

*The firing mechanism*

Although the hammer and hammer actuator are truly parts of the firing mechanism, they are being considered separately here. Thus, the firing mechanism will be understood to comprise sear 112, sear actuator 82, and a firing cable 164.

Sear 112 is essentially a cylindrical member mounted so as to be movable axially in blind opening 113 of the breech block. Considered as viewed in Figs. 15, 15B, 21 and 24, a cutaway portion 147 will be seen near the rear end, on the left side. Due to this cutaway portion there is provided a shoulder 148 which can selectively mate with and obstruct the movement of the hammer actuator's shoulder 141, as shown in Figs. 15 and 21, for reasons which will be made clear later. At the forward end of the sear, on its upper surface, there is provided another cutaway or notched portion 149. Because of this notched portion, the forwardmost end of the sear resembles a hook or claw 151. As illustratively shown in Figs. 15–15B, the sear's notched portion 149 serves to accommodate a hook or claw portion 152 on the rearmost end of sear actuator 82, while the sear's comparable claw 151 mates with the sear actuator's notched portion 153.

As reference to Fig. 15 will show, in addition to the rearward claw 152 and notch 153, the sear actuator constitutes an essentially cylindrical member having a rearward portion 154 whose circumference completely fills a cylindrical recess 156 therefor in a housing 165, and a lesser sized portion 157 at the forward end which fills a blind opening 158 in the same housing. At the juncture of recess 156 and blind opening 158 there is a shoulder 159 (see Fig. 15) which serves to limit the forward movement of the sear actuator by abutment therewith of the actuator's rearward portion 154.

With the sear actuator rotatively positioned as shown in Fig. 15, there will be noted on its lower surface a rear, relatively shallow recess 161 which is continuous with a forward, deeper recess 162. As will later be made clear, these recesses serve to accommodate firing safety 84 so as selectively to prevent axial movement of the sear actuator, and at the same time prevent its rotative movement once it has been placed in its proper position as shown.

A blind opening 163 extending inwardly from the forward face of sear actuator 82 and partly threaded, is provided for attachment of firing cable 164 as shown at 166. This cable leads through a fixed housing 165 therefor and runs through a flexible housing 167 to a trigger mechanism which will be described below.

*The firing safety mechanism*

The firing safety mechanism will be considered here as including, in part, safety 84 and a safety actuating pin 87. Later on, in discussing the trigger mechanism, there will be described a trigger safety device which also acts to prevent unintentional firing of the gun.

Safety 84 will be seen to consist of a cylindrical member which completely fills a transverse opening 83 that extends through the right-angled portion of cleft hinge lug 76. The safety is fitted so that it is freely rotatable by means of a handle 169 that projects exteriorly on the right side of the gun. It will be seen from Figs. 1, 5, 7 and 8 that handle 169 enables the operator to turn the safety from the "safe" position labeled "S" to a "fire" position labeled "F."

Figure 4:
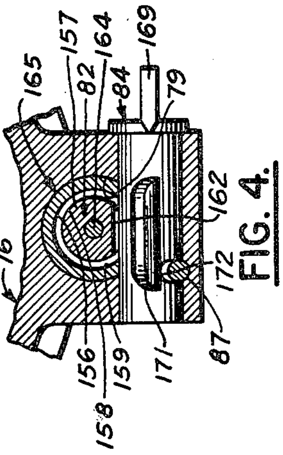
Fig. 4 is a sectional showing along lines 4—4 of Fig. 1 of the safety, one end of the firing cable housing, the sear actuator and the safety actuating pin.
Figure 3:
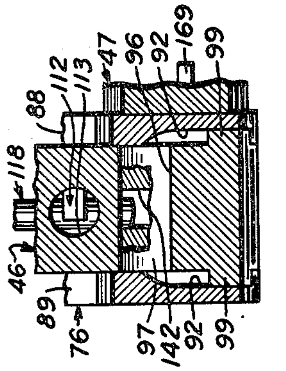
Fig. 3 is a sectional view from line 3—3 of Fig. 1 showing how the breech block fits between the arms of the cleft hinge lug of the venturi ring, and also certain relationships between the operating lever and the hammer actuator, the sear, and the firing safety.
Figure 2:
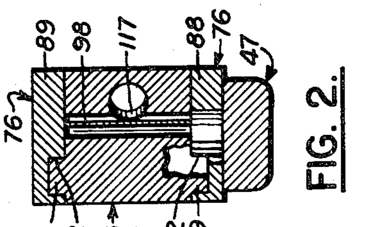
Fig. 2 is a section taken along line 2—2 of Fig. 1 primarily to show the engagement between locking lugs on the breech block with corresponding grooves or recesses on the opposed, inner faces of the cleft hinge lug projecting downwardly from the breech venturi ring.

The interior portion of the safety, i. e., the portion which is mounted within opening 83, is seen from Fig. 4 to bear a longitudinal recess 171 and, perpendicular thereto, another substantially semi-circular recess 172. It will be noted from Fig. 4 that recess 172 is located off the center of the safety. Such placement of this recess is necessary in order to permit safety actuating pin 87 which fits therein to be operable in conjunction with the rounded cam-like surface 173 at the bottom of breech block 46. It will be seen from the drawings that if recess 172 were centrally located with respect to the safety, pin 87 would then be in alignment with hammer actuator opening 117 at the bottom of the breech block, thereby making impossible the functioning of the safety mechanism in the manner which will be described below.

When the safety is in the "safe" condition, it has the position illustrated by Figs. 1, 4 and 15. In this position, as will be seen from Fig. 15, the external cylindrical surface of the safety completely fills the width of recess 162 in sear actuator 82. This relationship makes it impossible for the sear actuator to move, and therefore a tug on the firing cable will not result in any movement of the sear actuator or the sear; this prevents firing from taking place.

Figure 5:
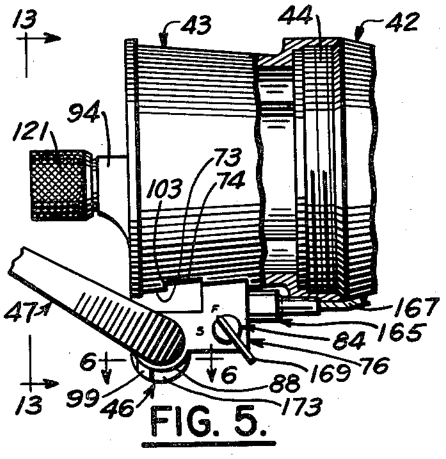
Fig. 5 is a side elevation view of the rear or breech end of the gun when the operating lever is turned so that the breech block is in the closed but unlocked position. The gun's wall has been partially torn away to show the threaded juncture of the breech venturi ring and the chamber.

When the safety is in the "fire" condition, it has the position illustrated in Figs. 5 and 15A. In this position, only a portion of the external cylindrical surface of the safety fills the width of recess 162 in the sear actuator. This relationship permits the sear actuator to be moved forwardly a distance equivalent to the depth of recess 171 in the safety. This distance, as will be seen by comparison of Figs. 15A and 15B and from later description below, is sufficient for the sear actuator to pull the sear forwardly so as to release the hammer actuator and in turn the hammer for firing the ammunition round.

From the description given above, it will be apparent that the safety can at will be turned from the "safe" position of Fig. 15 to the "fire" position of Figs. 15A–B when the breech block is in the closed position. However, to prevent accidental firing of an ammunition round when the breech block is flung from the open to the closed position, it is necessary that the safety be automatically moved to the "safe" position in case the operator should forget to so place that member. This function is accomplished by the safety actuating pin which is moved rearwardly into contact with the breech block (as in Fig. 15B) by the rear portion of the safety as the latter member is turned to the "fire" position. As Figs. 15B, 24A and 24B illustratively show, when the breech block is pulled open and withdrawn from the breech venturi ring, the block's cam-like bottom 173 makes contact with and pushes safety actuating pin 87 forwardly. This in turn causes pin 87 to push against the bottom of recess 172 and safety 84, thereby causing the safety to move counterclockwise, as seen in the reference drawing views. As the safety is so rotated, a shoulder of recess 171 contacts the shoulder 175 formed by the juncture of recesses 161—162 in the sear actuator, thereby causing the latter member to move rearwardly from the Fig. 15B position through that of Fig. 24A and finally to that of Fig. 24B. The condition of the safety with respect to the sear actuator is then identical with that shown sectionally in Fig. 15 and, as previously explained, positive protection is then given against unintentional firing of the weapon.

*The trigger mechanism*

The trigger mechanism is secured to the gun's barrel 41 by means of a split circular bracket 174. Projecting from the split ends of this bracket are lugs 177 which fit into an accommodating recess therefor in a handle 176. By means of a screw 178 lugs 177 are secured to the handle by threaded attachment and, at the same time, this draws these lugs together to secure circular bracket 174 to the gun barrel. Handle 176 serves as an aid to the gunner in steadying the weapon during the firing process. The handle is held, in the illustrated weapon, in the gunner's left hand (not shown), while the firing mechanism now to be described is held in his right hand (not shown).

At some convenient angle spaced from handle 176, preferably less than 90 degrees, there projects from bracket 174 two substantially rectangular, parallel brackets 179 and 181 (see Fig. 32). At their upper ends, these brackets are held spaced from each other by a stud 182, while at their lower ends a detent housing 183 serves the same purpose. Extending through the face of each bracket 179—181 is a substantially square slot 184. The firing cable's housing 167 has at its trigger end a fixture 186 which is aligned with slot 184. A cable end block 187, which is an essentially U-shaped member, is press fitted through both slots 184 to secure the cable housing end fixture in the position illustrated in Figs. 32 and 34.

Trigger 52 has the form best illustrated by Fig. 32. It consists of a large portion which projects forwardly at its uppermost end for accommodating the gunner's trigger finger, and a slender stem from which projects about midway thereon, on opposite faces of the member, trunnions 188 which fit into accommodating notches therefor in brackets 179—181. Projecting rearwardly from trigger 52 is a forklike construction 189 which straddles the trigger end of firing cable 164. At this extremity of the firing cable there is provided a ball end 191 which helps to keep the cable located within the forklike projection 189 but at the same time permits the cable to be movable up and down a limited distance within its housing.

Trigger safety 58 will be seen from Fig. 32 to be substantially L-shaped. Along its vertical length there are provided, on opposite faces of the trigger safety, trunnions 192 which, like the trigger member, also fit into accommodating notches provided therefor in bracket 179—181. Trigger 52 and trigger safety 58 are kept in their respective relationships as shown in Fig. 32 by means of a trigger spring 193 which is attached to both members as illustrated.

To actuate trigger 52, it is necessary for the gunner to press the uppermost portion thereof inwardly within brackets 179—181. This causes the trigger to pivot on its trunnions 188, thereby causing the forklike projection 189 to move downwardly against the ball end 191 of the firing cable which is thereby likewise moved downward. However, before this movement of the trigger can be made, it will be noted from Fig. 32 that the trigger's lowermost extremity will be prevented from pivoting forwardly by the hook-shaped, lowermost extremity 194 of trigger safety 58. To remove this arm 194 from the path of the trigger's movement, it therefore is necessary for the gunner to press trigger safety 58 forwardly within brackets 179—181, thereby pivoting the safety about its trunnions 192 to cause a lowering of hook-like arm 194 out of the path of the trigger.

The trigger housing and grip 53, which may be made of metal or plastic in separate sections or molded as a complete unit, preferably has the convenient finger-grip form shown in Figs. 31—32. It can be slipped over brackets 179—181 from the bottom upwardly to the illustrated position where it covers the brackets and permits only the uppermost end of trigger 52 and a part of the trigger safety 58 to protrude therefrom as shown in the drawings. To secure grip 53 in position, there is provided a detent 196 located in detent housing 183 between plates 179—181. This detent is resiliently loaded by means of spring 197 (see Fig. 33) and protrudes from plate 181 through a corresponding opening therefor in one face of the grip 53. When the grip is slid over the bracket into place, detent 196 is depressed until the opening through the grip coincides therewith, whereupon the detent is released and permitted to protrude from the grip (see Figs. 30 and 33).

*Operation of the novel weapon*

From the foregoing it will be seen that there has been provided an improved recoilless gun which offers important advantages in connection with both loading and firing. To place the ammunition round 69—70 within the weapon, it is merely necessary to pull operating handle 47 counterclockwise to its extreme rear position to unlock breech block 46, at the same time withdrawing it from the breech venturi ring 43 and further swinging it completely free of the opening into the gun's chamber. This opening of the gun by a single sweep of operating handle 47 is progressively shown by Figs. 1, 5, 7 and 8, as seen from the side of the gun, and by Figs. 11, 13 and 14, as seen from the rear. Figs. 24A and 24B are enlarged showings of two steps in opening the breech block.

As the breech block is swung open, the safety mechanism which prevents unintentional firing of the gun is automatically set. Thus, when the breech block is again closed, the gun cannot be fired unintentionally without re-setting of the safety to the "fire" position. When the breech block is again closed, presumably after the insertion of an ammunition round in the weapon, the forward or clockwise movement of the operating handle (which effects the breech block's closure at the same time) cocks the hammer and firing pin preparatory to another firing of the gun. Details of this breech block closing and hammer cocking by movement of the handle will now be set forth.

*Breech block closing and locking by handle movement*

Figure 8:
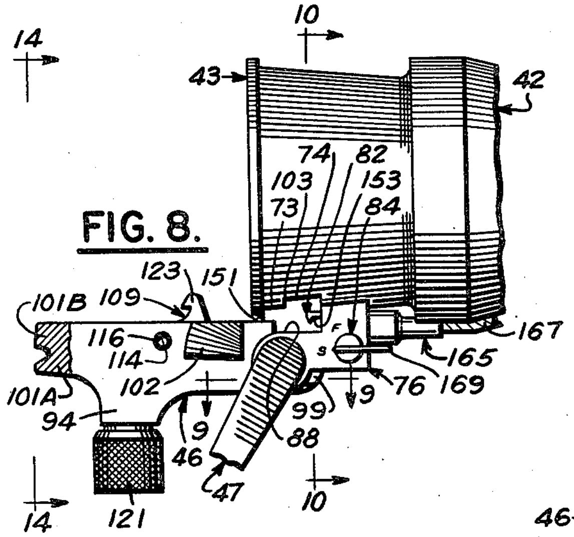
Fig. 8 shows the next progressive step of opening the breech block which has now been withdrawn the maximum possible distance from the breech venturi ring.
Figure 6:
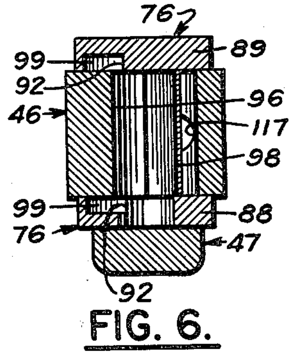
Fig. 6 is a section taken along line 6—6 of Fig. 5 to show the position of the locking lug on the breech block when disengaged from the grooves in the cleft hinge lug.
Figure 9:
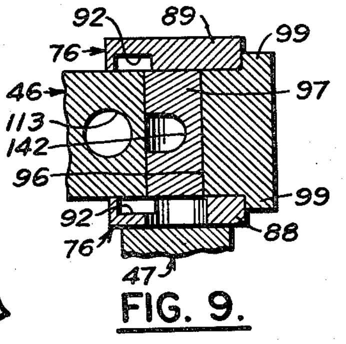
Fig. 9 is a section taken along line 9—9 of Fig. 8 and shows the engagement of the arcuate portions of the small locking lugs on the breech block with the circular contour of the cleft hinge lug.
Figure 10:
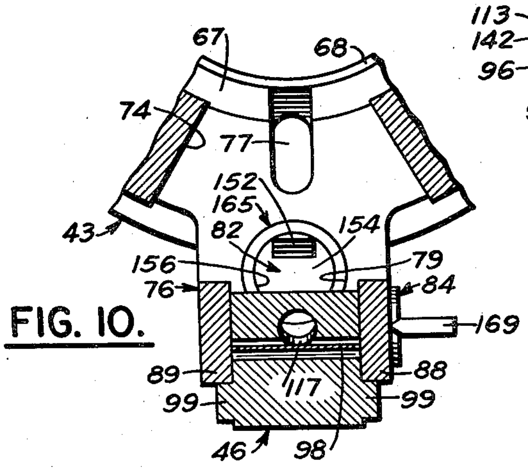
Fig. 10 is a section from line 10—10 of Fig. 8 which shows recesses in the venturi ring which receive the ammunition round and which house the extractor, the opening for accommodating large breech block locking lugs, the sear actuator, and the engagement between small breech block locking lugs and the bottom of the venturi ring's cleft hinge lug whereby the opening of the breech block is limited.

Assuming that the gun has been fired and the breech block open to the position shown in Figs. 8, 14 and 24B, an ammunition round is now placed in the Fig. 15 position, and the breech is now ready to be closed preparatory to firing the gun. This is accomplished by turning handle 47 clockwise as viewed in Fig. 1. About midway between the fully opened and fully closed and locked position of the operating handle, the breech block is placed in the closed position represented by Figs. 13 and 24. In this position it will be noted that lugs 99 have become aligned with notches 92 on the inner side of the opposing arms 88—89 of cleft hinge lug 76. At the same time triangular breech block locking lugs 102 have become aligned with the corresponding recesses 73—74 in the breech venturi ring. Continued forward movement of the operating handle turns its cam portion 97 from the Fig. 24 position to that of Fig. 15. In so doing, this cam portion 97 pushes against the resilient closing plate 98 and also the walls of cleft hinge lug 76 through which it extends. This pressure of cam 97 against hinge lug 76 causes a cam-like action which moves breech block 47 upwardly from the Fig. 24 to the Fig. 15 position. This upward movement of the breech block causes the block to be locked at three points: at its uppermost extremity its bifurcated end 101A—101B is lockingly engaged with corresponding bifurcated recess 72A—72B in the breech venturi ring; the triangular lugs 102 become wedged in recess 74; and the small locking lugs 99 become engaged with notches 92 on cleft hinge lugs arms 88—89.

*Cocking of hammer and setting of safety by handle movement*

Fig. 15B represents the condition of the various parts of the firing mechanism just after the gun has been fired. The cocking of the hammer and the setting of the safety will now be traced from this point back to the condition when another ammunition round is about to be fired. Operating handle 47 is first moved to the left or counterclockwise. When it reaches the position shown by Figs. 5 and 13, the various firing mechanism and associated parts have the relative relationship shown by Fig. 24. The uppermost breech block extremities 101A, 101B have dropped out of engagement with recesses 72A, 72B, the angular lugs 102 have similarly dropped out of engagement with recess 74, and the same has happened to lugs 99 which are no longer in engagement with notches 92.

This lowering of the breech block causes disengagement of the claw end 152 of sear actuator 82 from the notch 149 in sear 112. At the same time, the turning of the handle has caused its cam portion 97 to move from the Fig. 15 to the Fig. 24 position so that the cam pushes hammer actuator 118 upwardly. The slanted uppermost end 137 of hammer actuator 118 is by this upward movement caused to ride along the rearward slanted wall 143 of triangular recess 134 in the hammer. This in turn causes hammer 107 to be moved rearwardly, cocking it against the hammer spring 119 which is thus loaded under pressure against cap 121.

Now as the operating handle is continued to be moved rearwardly, it reaches the position shown by Figs. 5, 13 and 24A. Referring to the last-named view, it will be seen that the claw portion 123 of cartridge case extractor 109 makes contact with the rear or head end of case 69 and begins to withdraw same from the gun. It will further be noted that as the breech block is lowered, its lowermost cam-like portion 173 makes contact with safety actuating pin 87 which is thereby forced forwardly fully into recess 86 in the cleft hinge lug as shown in Figs. 24A and 24B. This movement causes the forward end of the safety actuator pin to enter the semicircular recess 172 in safety 84, thereby pushing the safety counterclockwise from the "fire" position of Fig. 15B to the "safe" position shown in Figs. 15 and 24B.

With the breech block completely down and the entrance to the gun entirely open, a new ammunition round may now be inserted into the gun's chamber. Subsequently, handle 47 is rotated clockwise again to thus bring the breech block once more to the Fig. 24 position and finally to that of Fig. 15 when the block is locked. Locking of the breech block again places the sear and sear actuator into engagement with one another by virtue of the interlocking between the sear actuator's claw end 152 and the sear's accommodating notch 149 therefor, and similar interlocking between the sear's claw end 151 with the sear actuator's accommodating notch 153. At the same time, the forwardmost end of the sear abuts against the rearwardmost face of the sear actuator thereby causing the sear to move rearwardly. This causes shoulder 148 of the sear to become engaged with shoulder 141 of hammer actuator 118 and thereby prevent downward movement of the latter member which is necessary to permit the hammer and firing pin to move forwardly. As a result, positive protection is offered against unintentional or accidental firing of the gun.

*Firing the weapon*

When the weapon is to be fired, it may conveniently be placed upon a gunner's shoulder employing the convenient shoulder and face rest 54. In the illustrated weapon which is arranged for a right-handed gunner, he would take a position on the left side of the gun facing forwardly, place his right shoulder beneath and his head along the top of the shoulder and face rest 54, and sight through an appropriate sighting device (not shown). His left hand would hold the convenient handle 176 by means of which he could steady the gun, while his right arm would reach under the gun so that his right hand could grasp the trigger mechanism. An associate gunner would then turn operating handle 47 counterclockwise to open the breech block as explained before, place ammunition round 69—70 in the gun, and return the operating handle clockwise to its forwardmost position so that the breech block will be closed and locked as described before. Then, stepping out of the path of the rearward exhaust of explosive gases, the associate gunner turns safety handle 169 from the "safe" position shown in Fig. 1 to the "fire" position shown in Fig. 5.

This turning of the safety has the effect of turning it from the Fig. 15 to the Fig. 15B position, and from those drawings it will be seen that this permits room for the sear actuator to move forwardly the distance represented by the depth of recess 171 in the safety. When the gunner depresses trigger safety 58, then follows with a rearward depression of trigger 52, downward movement is imparted to firing cable 164 which results in a forward movement of sear actuator 82. Since the sear actuator is now engaged with the sear, this causes the sear to be moved forwardly so that its engagement with the hammer actuator is broken. Instantly, hammer actuator 118 drops down through the cutaway 147 in the sear into the recess 142 provided therefor in the cam portion 97 of the operating handle. With the hammer actuator no longer restraining the hammer in its original cocked position, spring 119 instantly forces the hammer to move forwardly and firing pin 106 springs out of the breech block to detonate the ammunition round's primer (not shown).

*Conclusion*

From the foregoing it will be seen that we have provided valuable improvements in recoilless guns of the type wherein the forces of rearward reaction that result from a projectile's discharge are neutralized by forwardly acting counterforces simultaneously set up by a rearward escape of propellant powder gases through openings or orifices in the gun's breech; that by our improvements we have made possible such guns of exceptionally light weight; that we have simplified the structure of such guns and reduced the number of parts needed by the gun's breech and firing mechanisms, and arranged those parts so compactly as to act in a unique and efficient manner; that we have provided a design for such recoilless guns in which the venturi is a smooth, uninterrupted annular orifice completely contained within a single gun member; that we have provided means for minimizing the time and cost of replacing the venturi and other breech and firing mechanisms which may become damaged or eroded upon extensive usage; that we have provided a positively actuated firing mechanism and eliminated the possibility of "hair-trigger" firing thereof; that we have incorporated novel "double safety" features into the gun's breech and firing mechanisms; and that we have provided a gun design which makes possible assembly and disassembly of the entire weapon without the use of tools.

It will be apparent from the above description that our herein disclosed invention contains design features and advantages constituting important improvements over the related prior art weapons. One outstanding characteristic is the use of the cartridge case head as a part of the gun's breech block, thus enabling a considerable lightening of the weapon's weight. Another is the complete enclosure of the annular orifice or venturi in a single metal piece, rather than forming it from two or more adjacent breech parts, thus minimizing erosion which generally sets in most severely at metal interfaces. The use of the sliding breech block, actuated by the sweep of the gun's operating handle is another outstanding design feature. And finally, the unique design whereby functional gun parts are used to tie other functional gun parts together, thereby eliminating the need for bolts, screws, nuts and tools therefor, is still another novel and valuable feature.

It will be obvious to those skilled in the art that the inventive improvements herein disclosed thus are capable of wide application and hence are not to be restricted to the specific form here shown and described by way of illustration.

We claim:

1. In a recoilless rifle having a barrel, a projectile receiving chamber in a rear portion thereof, a propelling charge receiving chamber behind the projectile chamber, a cartridge case for containing said charge and adapted to be inserted in said last-mentioned chamber, said cartridge case having perforations in its side walls whereby gases may move radially outward and then rearwardly on firing said rifle, said cartridge case having a base by means of which said case may be extracted after firing, venturi passageways through which gases move rearwardly into atmosphere, a breech block for a rear end of said rifle, means whereby said breech block may be opened and closed, and means carried by said breech block for firing said gun, the combination therewith of the improvement enabling the weight of said rifle to be reduced, said improvement comprising said breech block being constituted by a bar having generally parallel side portions and extending transversely across and contiguous to a rear face of the cartridge case base, said breech bar when in closed position exposing to view from the rear substantial portions of the rear face of said cartridge case base radially beyond the generally parallel sides of the bar, said cartridge case base being of a thickness and shape to seal the gases generated on firing from blowing rearwardly out the base of said case on either side of said breech bar and within said breech opening when the bar is in closed position, said breech bar being of a size capable of holding the cartridge case in place during firing, yet of a size to have a weight less than that of a breech block heretofore fully closing the recoilless rifle in back of said cartridge case.

2. A rifle according to claim 1 in which said venturi passageways are radially entirely outside said breech block and the breech opening through which a cartridge case is inserted, whereby no portion of the breech block constitutes a side wall of any venturi passageway.

3. A rifle according to claim 1 in which the weight of said breech bar is about half the weight of a breech block fully closing a breech opening in a recoilless rifle in back of said cartridge case.

References Cited in the file of this patent

UNITED STATES PATENTS

| | | |
|---|---|---|
| 378,828 | Driggs | Feb. 8, 1888 |
| 464,518 | Parkhurst | Dec. 8, 1891 |
| 795,221 | Hammer | July 16, 1905 |
| 797,853 | Hermsdorf | Aug. 22, 1905 |
| 1,108,717 | Davis | Aug. 25, 1914 |
| 2,156,605 | Prettyman | May 2, 1939 |
| 2,421,522 | Pope | June 6, 1947 |
| 2,444,949 | Musser | July 13, 1948 |
| 2,466,714 | Kroeger et al. | Apr. 12, 1949 |
| 2,480,328 | Johnston | Aug. 30, 1949 |
| 2,489,747 | Burney | Nov. 29, 1949 |
| 2,489,954 | Burney | Nov. 29, 1949 |
| 2,492,279 | Fowler | Dec. 27, 1949 |
| 2,537,062 | Kroeger et al. | Jan. 9, 1951 |
| 2,598,256 | Hickman | May 27, 1952 |

FOREIGN PATENTS

| | | |
|---|---|---|
| 837,062 | France | Nov. 3, 1938 |
| 954,164 | France | June 6, 1949 |
| 494,910 | Belgium | Aug. 1, 1950 |